United States Patent
Ohana

(10) Patent No.: US 10,148,798 B2
(45) Date of Patent: Dec. 4, 2018

(54) PHY/MAC INTERFACE (PMI) FOR COMMUNICATION SYSTEMS

(71) Applicant: BROADCOM CORPORATION, Irvine, CA (US)

(72) Inventor: Yitshak Ohana, Givat Zeev (IL)

(73) Assignee: Avago Technologies International Sales Pte. Limited, Singapore (SG)

( * ) Notice: Subject to any disclaimer, the term of this patent is extended or adjusted under 35 U.S.C. 154(b) by 660 days.

(21) Appl. No.: 14/674,726

(22) Filed: Mar. 31, 2015

(65) Prior Publication Data

US 2015/0296057 A1    Oct. 15, 2015

Related U.S. Application Data

(60) Provisional application No. 62/139,661, filed on Mar. 28, 2015, provisional application No. 61/980,501, filed on Apr. 16, 2014, provisional application No. 61/979,623, filed on Apr. 15, 2014.

(51) Int. Cl.

| | |
|---|---|
| *H04L 29/06* | (2006.01) |
| *H04L 29/08* | (2006.01) |
| *H04W 28/18* | (2009.01) |
| *H04L 12/24* | (2006.01) |
| *H04L 5/00* | (2006.01) |
| *H04W 74/00* | (2009.01) |

(52) U.S. Cl.
CPC ........ *H04L 69/323* (2013.01); *H04L 41/0806* (2013.01); *H04L 69/324* (2013.01); *H04W 28/18* (2013.01); *H04L 5/0037* (2013.01); *H04L 5/0091* (2013.01); *H04W 74/006* (2013.01)

(58) Field of Classification Search
CPC .......... H04L 69/22; H04L 69/33; H04L 69/02
See application file for complete search history.

(56) References Cited

U.S. PATENT DOCUMENTS

| | | | |
|---|---|---|---|
| 2002/0012343 A1* | 1/2002 | Holloway | ............. H04L 1/0003 370/389 |
| 2014/0199080 A1* | 7/2014 | Ramesh | ................. H04B 10/40 398/116 |

* cited by examiner

*Primary Examiner* — Robert M Morlan
*Assistant Examiner* — Pamit Kaur
(74) *Attorney, Agent, or Firm* — Garlick & Markison; Shayne X. Short

(57) ABSTRACT

A communication device is configured to support communications with other devices using a physical layer (PHY)/MAC interface (PMI) protocol. For example, a first device that includes PHY component(s) may be located remotely with respect to one or more other entities that manage and control it. In one example, a second device generates (core receives from another device) a MAC message that is based on the PMI protocol and generates a PHY message based thereon. This first device and then transmits the PHY message to the first device for use by the first device to configure PHY operational parameter(s). Generally, different messages are communicated between devices based on the PMI protocol. The first device, which may generally be referred to as a remote PHY device (RPD), can be managed and controlled by one or more other devices located separately therefrom.

20 Claims, 9 Drawing Sheets

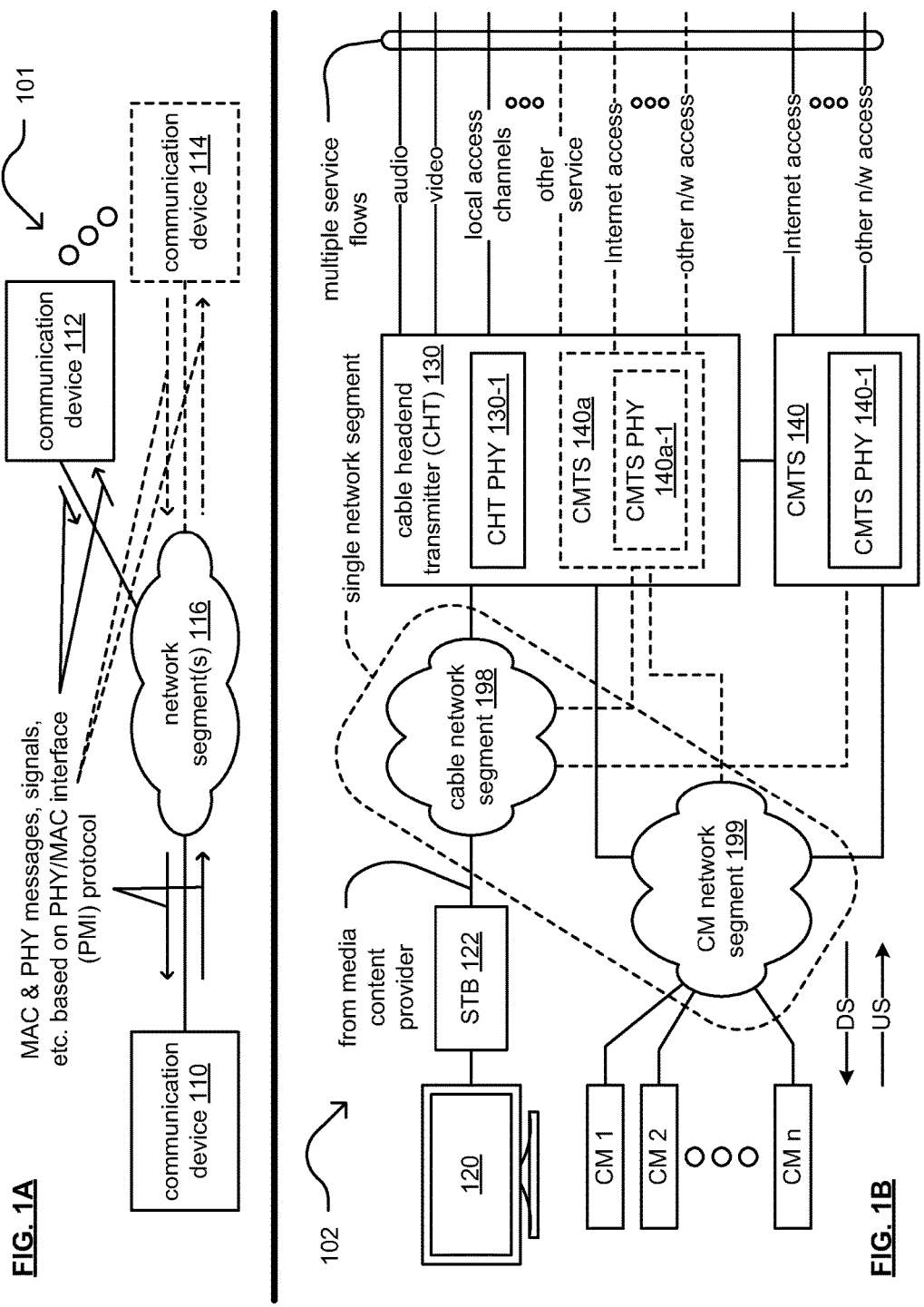

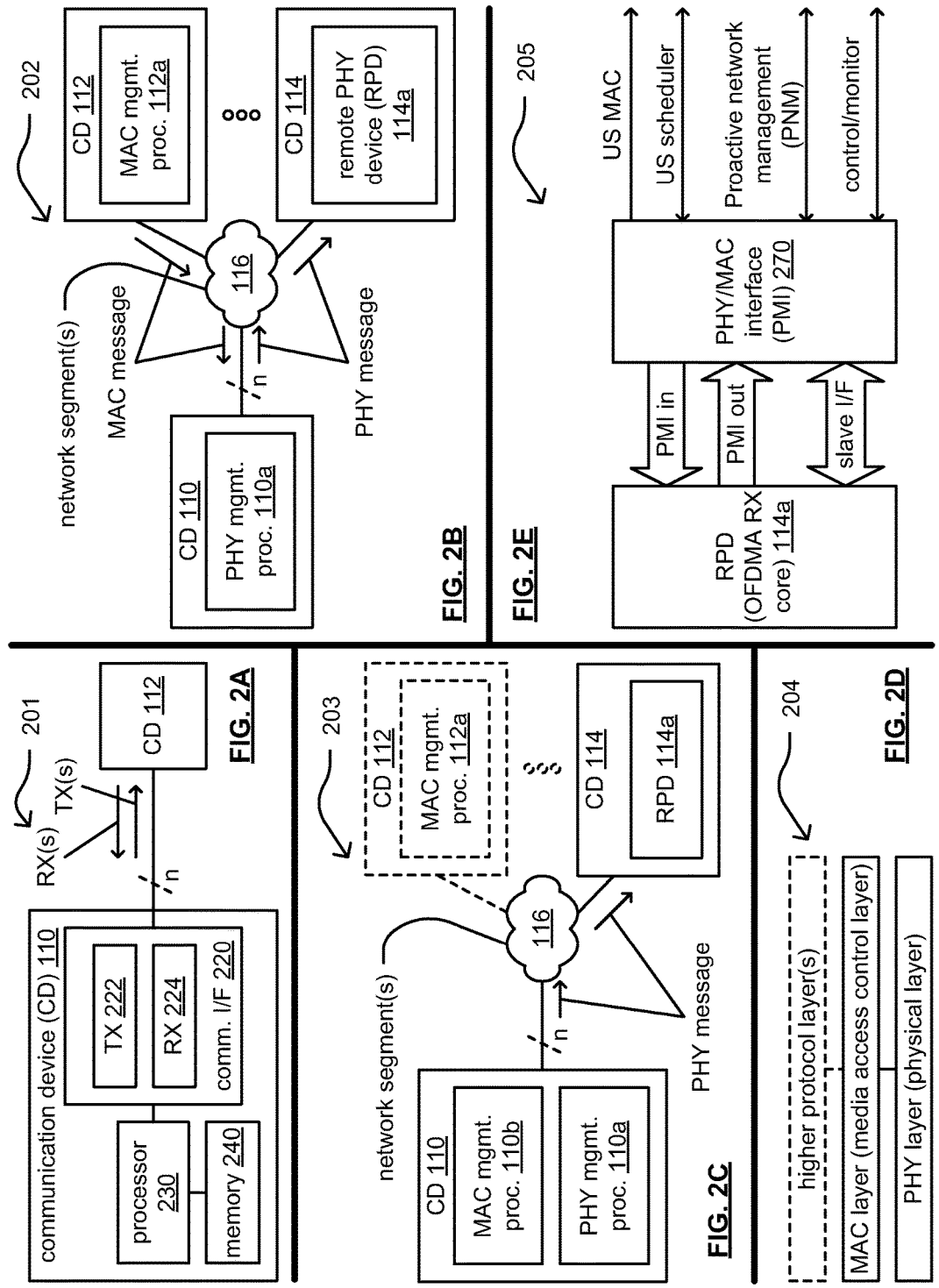

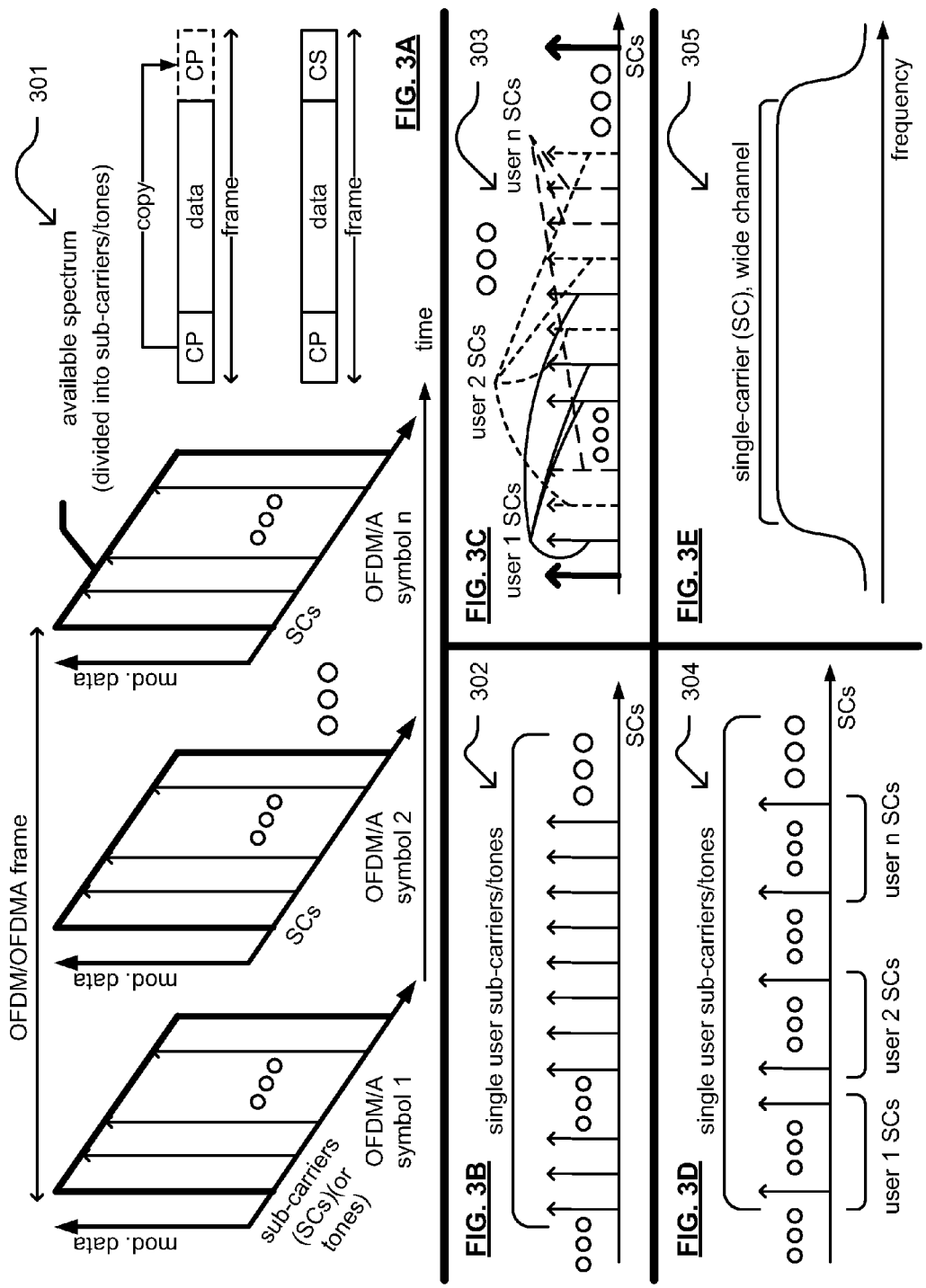

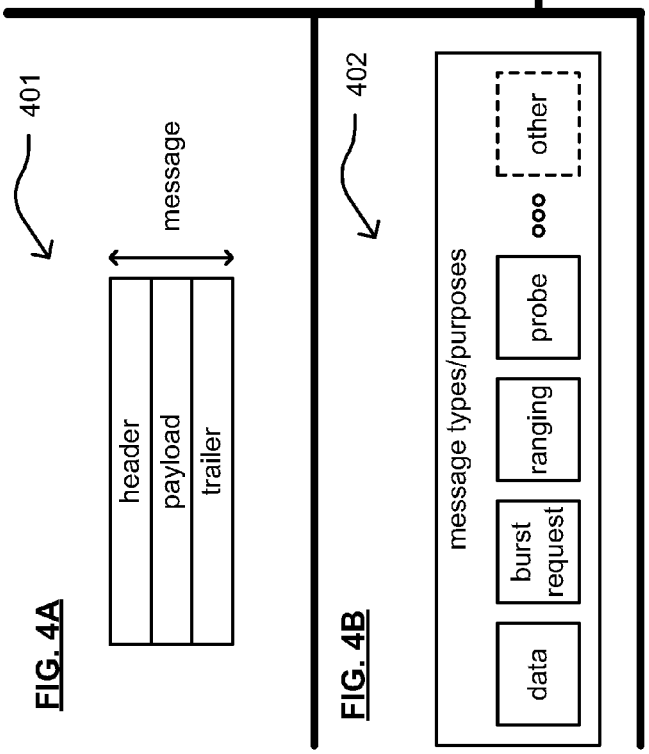
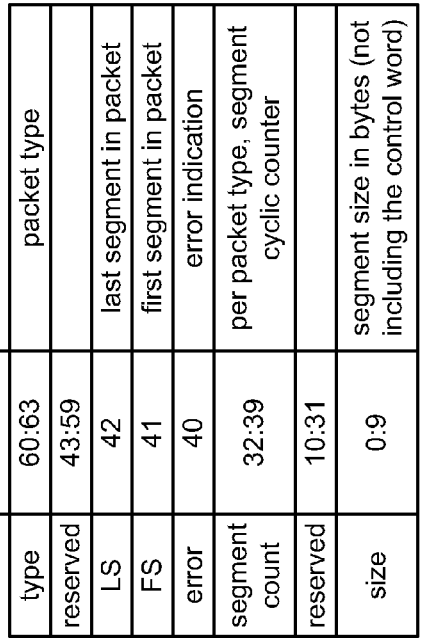
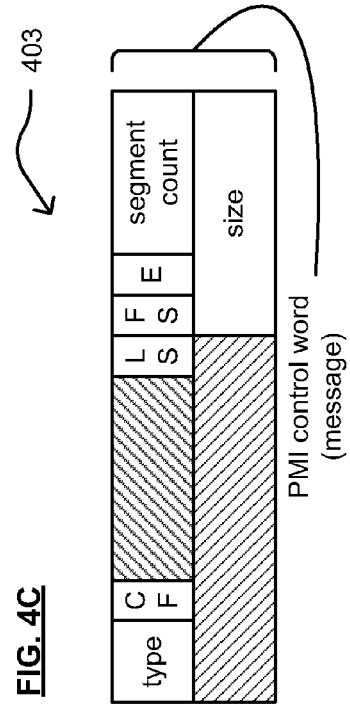
FIG. 4A
FIG. 4B
FIG. 4C
FIG. 4D

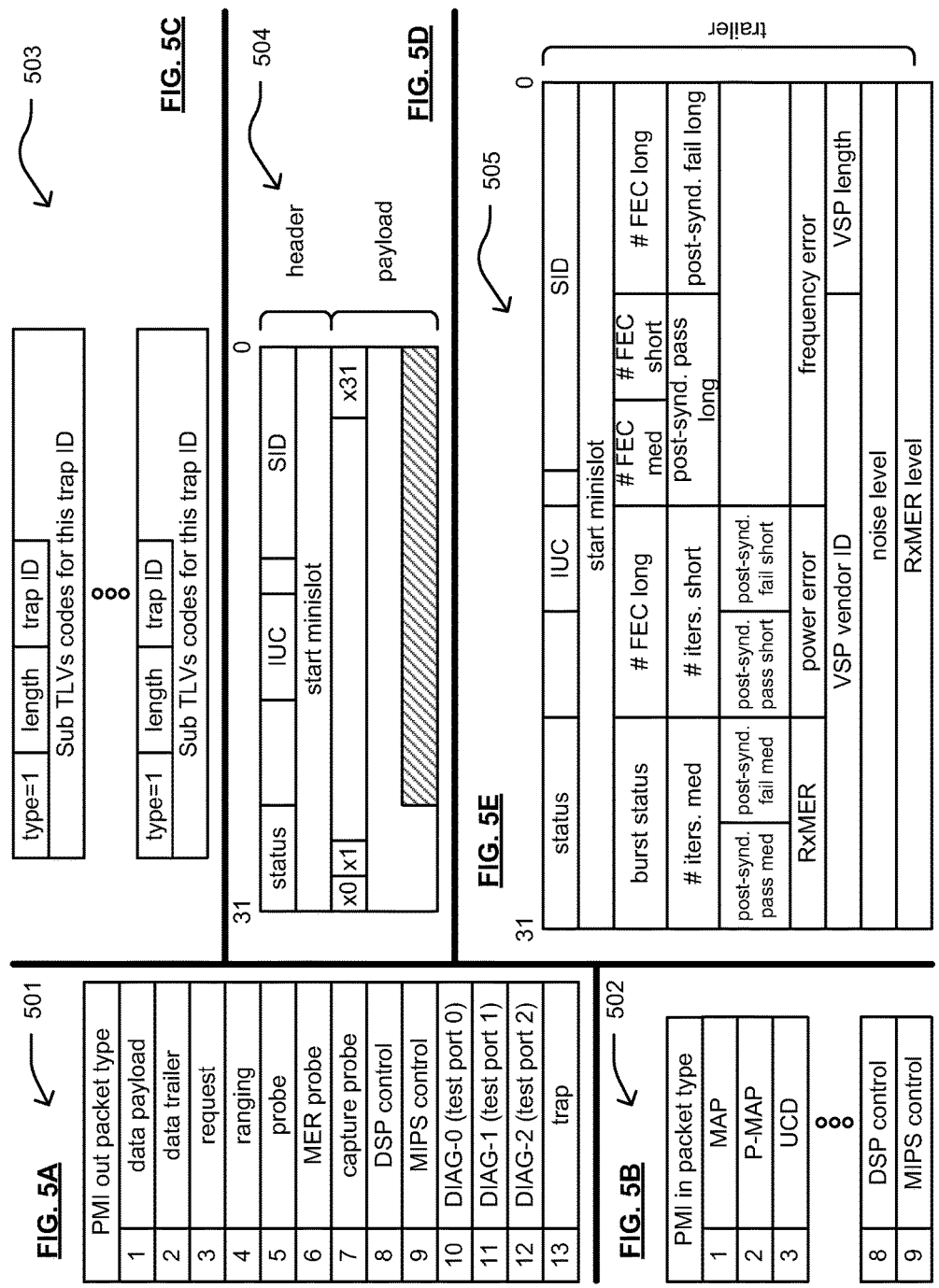

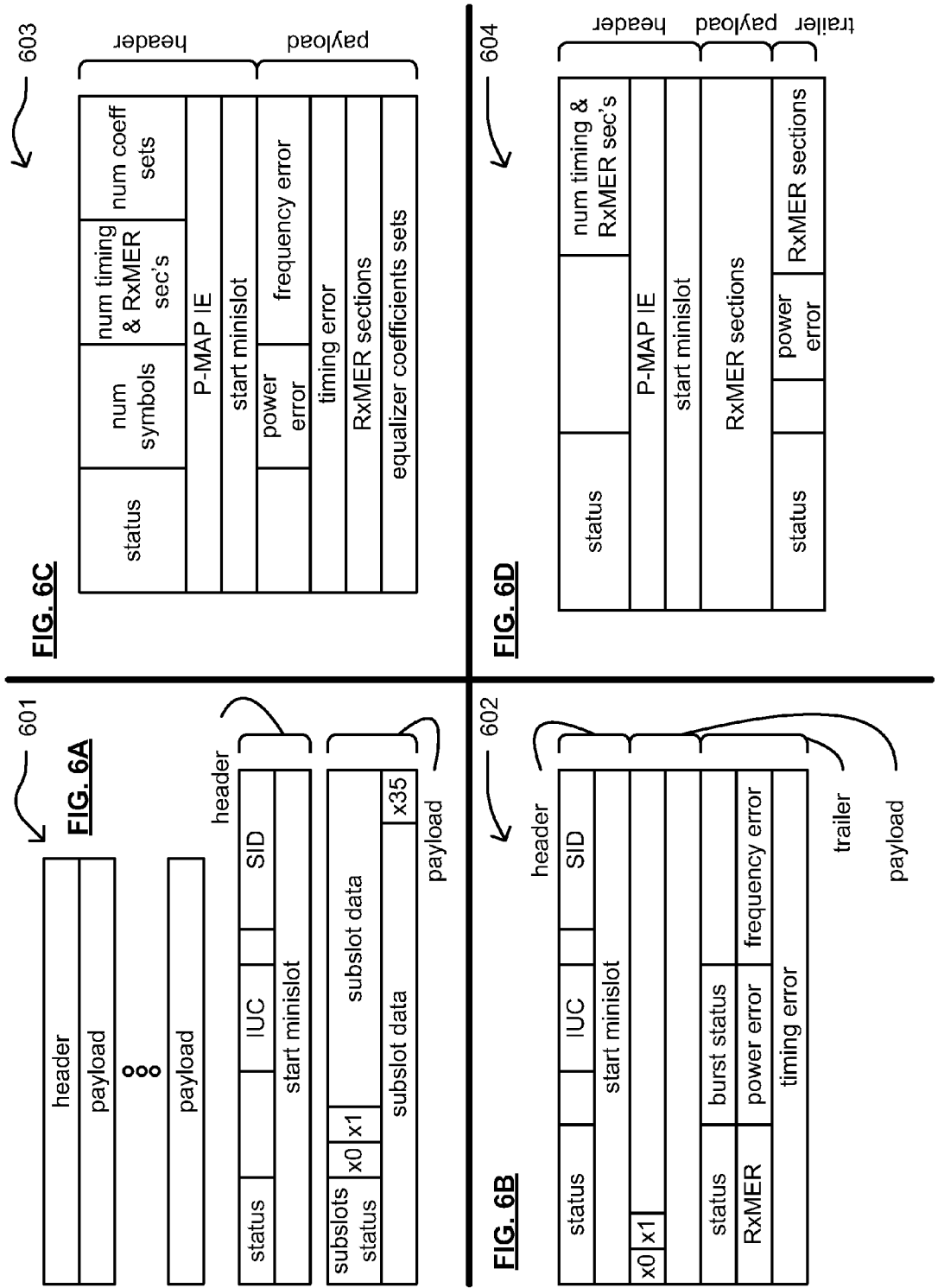

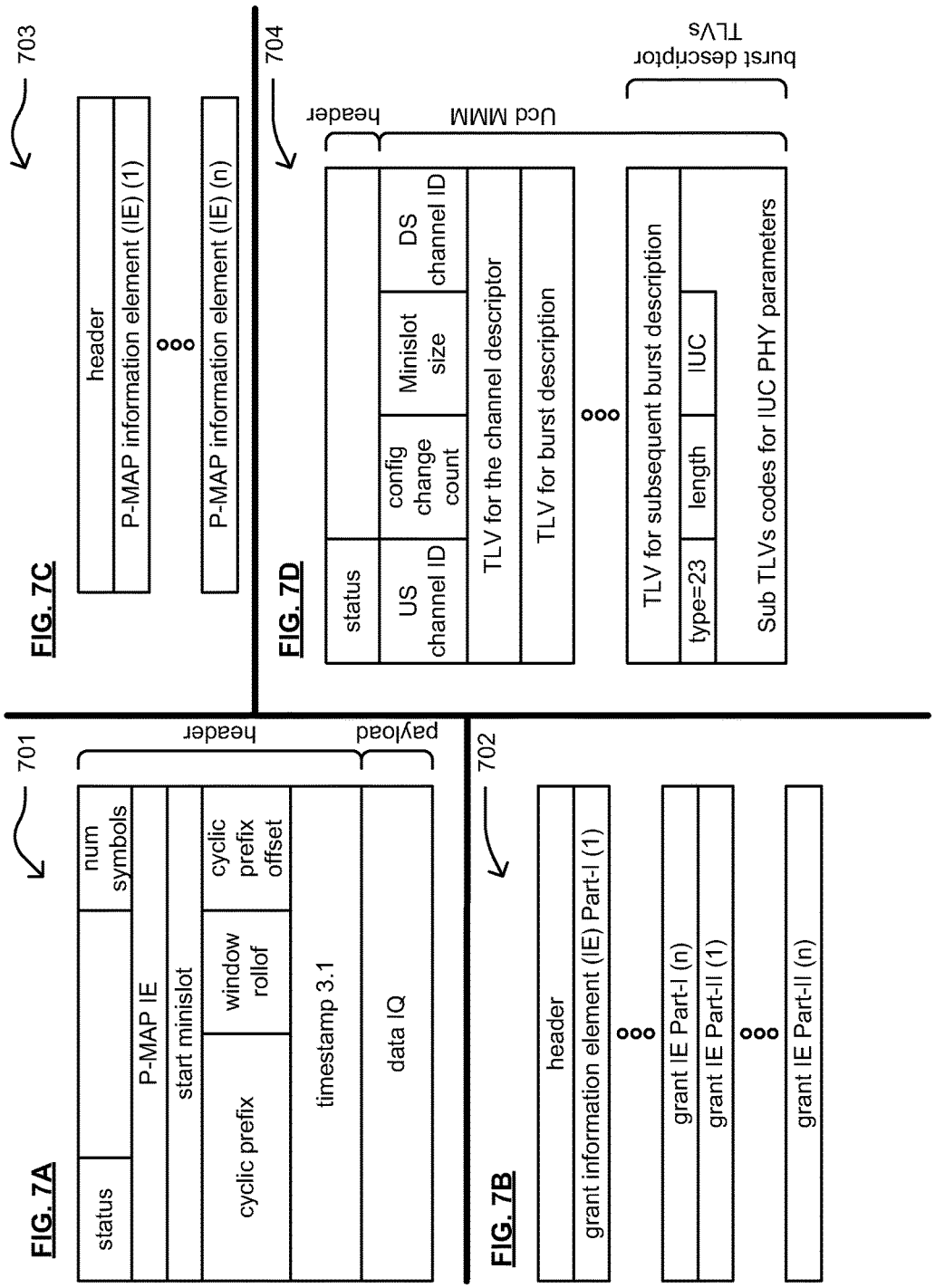

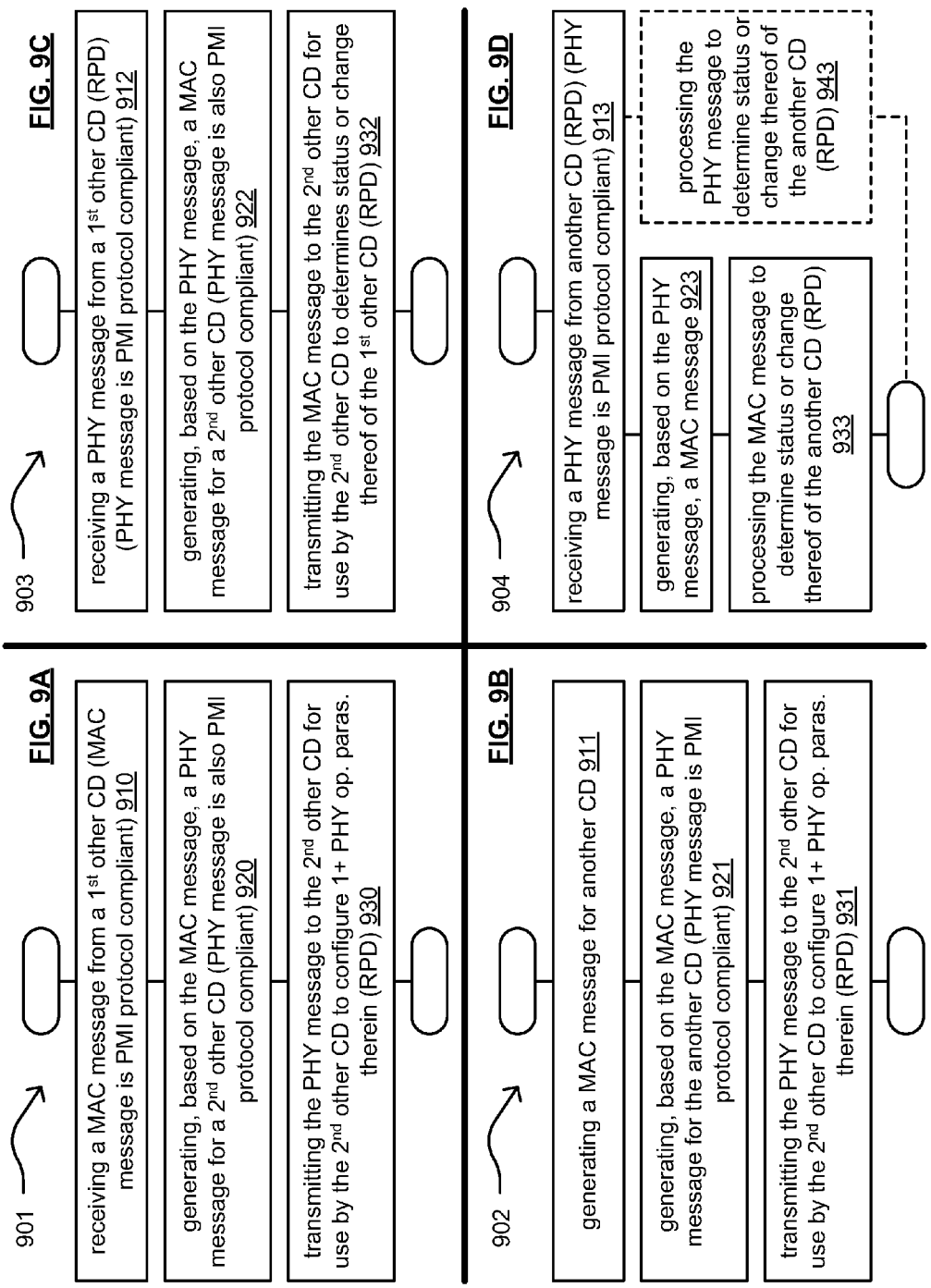

PHY/MAC INTERFACE (PMI) FOR COMMUNICATION SYSTEMS

CROSS REFERENCE TO RELATED PATENTS/PATENT APPLICATIONS

Provisional Priority Claims

The present U.S. Utility patent application claims priority pursuant to 35 U.S.C. § 119(e) to U.S. Provisional Application No. 61/979,623, entitled "Upstream PMI for communication systems," filed Apr. 15, 2014; U.S. Provisional Application No. 61/980,501, entitled "Upstream PMI for communication systems," filed Apr. 16, 2014; and U.S. Provisional Application No. 62/139,661, entitled "PHY/MAC interface (PMI) for communication systems," filed Mar. 28, 2015, all of which are hereby incorporated herein by reference in their entirety and made part of the present U.S. Utility patent application for all purposes.

BACKGROUND

Technical Field

The present disclosure relates generally to communication systems; and, more particularly, to physical layer (PHY) device management within such communication systems.

Description of Related Art

Data communication systems have been under continual development for many years. The primary goal within such communication systems is to transmit information successfully between devices. Such communication systems may include a number of different devices distributed and located in different locations.

Coordination and control among various devices can be a challenge, and the prior art does not present an adequate and sufficient means by which such operations may be performed effectively. In addition, oftentimes different devices operate using different message types and can also be based on proprietary communication protocols making coordination and control among the various devices even more difficult. There continues to be a need for improved and better ways to effectuate communication between devices within communication systems.

BRIEF DESCRIPTION OF THE SEVERAL VIEWS OF THE DRAWINGS

FIG. 1A is a diagram illustrating an embodiment of one or more communication systems.

FIG. 1B is a diagram illustrating another embodiment of one or more communication systems.

FIG. 2A is a diagram illustrating an example of a communication device (CD) operative within one or more communication systems.

FIG. 2B is a diagram illustrating another example of a CD operative within one or more communication systems.

FIG. 2C is a diagram illustrating another example of a CD operative within one or more communication systems.

FIG. 2D is a diagram illustrating an example of the relationship between a physical layer (PHY), a media access control (MAC) layer, and higher protocol layers.

FIG. 2E is a diagram illustrating an example of a physical layer (PHY)/media access control (MAC) interface (PMI) as may be implemented within a communication device and/or communication system.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 4A is a diagram illustrating an example of a message that is compliant with a PHY/MAC interface (PMI) protocol.

FIG. 4B is a diagram illustrating an example of a message types/purposes.

FIG. 4C is a diagram illustrating an example of a PMI control word.

FIG. 4D is a diagram illustrating an example of a PMI packet.

FIG. 5A is a diagram illustrating an example of a PMI out packet type.

FIG. 5B is a diagram illustrating an example of a PMI in packet type.

FIG. 5C is a diagram illustrating an example of a trap used to indicate an error detected by the PHY.

FIG. 5D is a diagram illustrating an example of a header and payload of a message that is compliant with a PMI protocol.

FIG. 5E is a diagram illustrating an example of a trailer of a message that is compliant with a PMI protocol.

FIG. 6A is a diagram illustrating an example of a request subslots message.

FIG. 6B is a diagram illustrating an example of a ranging message.

FIG. 6C is a diagram illustrating an example of a pre-equalizer probe message.

FIG. 6D is a diagram illustrating an example of a modulation error ratio (MER) probe message.

FIG. 7A is a diagram illustrating an example of a capture probe message.

FIG. 7B is a diagram illustrating an example of a MAP message.

FIG. 7C is a diagram illustrating an example of a P-MAP message.

FIG. 7D is a diagram illustrating an example of an upstream (US) channel descriptor (UCD) format message.

FIG. 9A is a diagram illustrating an embodiment of a method for execution by one or more communication devices.

FIG. 9B is a diagram illustrating another embodiment of a method for execution by one or more communication devices.

FIG. 9C is a diagram illustrating another embodiment of a method for execution by one or more communication devices.

FIG. 9D is a diagram illustrating another embodiment of a method for execution by one or more communication devices.

DETAILED DESCRIPTION

Figures 8A, 8B:
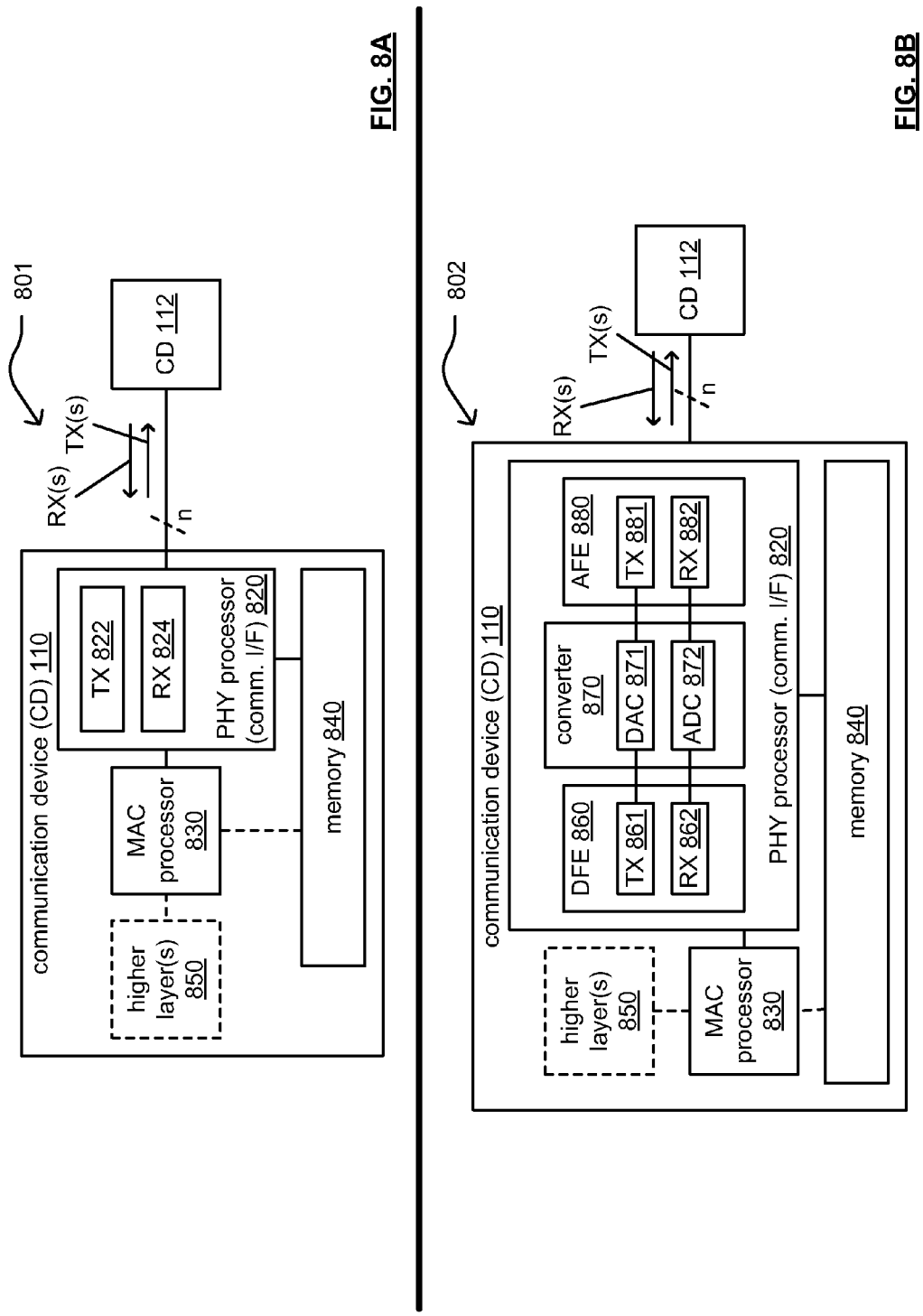
FIG. 8A is a diagram illustrating another example of a CD operative within one or more communication systems.
FIG. 8B is a diagram illustrating another example of a CD operative within one or more communication systems.

FIG. 1A is a diagram illustrating an embodiment 101 of one or more communication systems. One or more network segments 116 provide communication inter-connectivity for at least two communication devices 110 and 112 (also referred to as CDs in certain locations in the diagrams). Note that general reference to a communication device may be made generally herein using the term 'device' (e.g., device 110 or CD 110 when referring to communication device 110, or devices 110 and 112, or CDs 110 and 112, when referring to communication devices 110 and 112). Generally speaking, any desired number of communication devices are included within one or more communication systems (e.g., as shown by communication device 114).

The various communication links within the one or more network segments 116 may be implemented using any of a variety of communication media including communication links implemented as wireless, wired, optical, fiber-optic, satellite, microwave, and/or any combination thereof, etc. communication links. Also, in some instances, communication links of different types may cooperatively form a connection pathway between any two communication devices. Considering one possible example, a communication pathway between devices 110 and 112 may include some segments of wired communication links and other segments of optical communication links. Note also that the devices 110-114 may be of a variety of types of devices including stationary devices, mobile devices, portable devices, etc. and may support communications for any of a number of services or service flows including data, telephony, television, Internet, media, synchronization, etc.

In an example of operation, device 110 includes a communication interface and a process configured to support communication with one or more of the other devices 112-114. This communication may be bidirectional/to and from the one or more of the other devices 112-114 or unidirectional (or primarily unidirectional) from the one or more of the other devices 112-114.

In an example of operation, one of the devices, such as device 110, includes a communication interface and a processor that cooperatively operate to support communications with another device, such as device 112, among others within the system. The processor is operative to generate and interpret different signals, frames, packets, symbols, etc. for transmission to other devices and that have been received from other devices.

In an example of operation, the device 110 receives, from device 112, a media access control (MAC) message for device 114. The device 114 includes a remote PHY device (RPD) that is to be managed and controlled by the device 110 and device 112. This MAC message is based on a physical layer (PHY)/MAC interface (PMI) protocol. The device 110 generates, based on the MAC message, a physical layer (PHY) message for the device 114, and the PHY message is also based on the PMI protocol. The device 110 then transmits the PHY message to device 114 for use by the device 114 to configure at least one PHY operational parameter within the device 114. The device 114 is remotely with respect to the device 110. Examples of PHY operational parameter may include information used for channel estimation, characterization, ranging parameters, equalizer parameters, any parameter that specifies any components of an analog front end (AFE), modulation scheme, modulation coding set (MCS) scheme, sub-carrier assignments, slot, mini-slot or subslot assignments, equalizer coefficient setting(s), etc. and/or any other operational parameters that may be used effectuate communications at the PHY layer. As one example with respect to probe, probe(s) can be sent to a communication device (e.g., to a CM) from a transmitter communication device, and that recipient communication device then generates certain PHY metrics of the recipient communication device measured from those received probe(s) and can transmit those PHY metrics to the transmitter communication device (and/or other communication device(s)).

In another example of operation, the device 110 generates a MAC message for device 114. The device 114 includes a remote PHY device (RPD) that is to be managed and controlled by the device 110. The device 110 then generates, based on the MAC message, a PHY message for the device 114, and the PHY message is based on the PMI protocol. In this example, note that the MAC message generated within the device 110 need not necessarily be based on the PMI protocol since such communication between the MAC and PHY layers within the device 110 are performed internally, and this particular MAC message is generated by the device 110, the communications between the MAC and PHY layers within the device 110 need necessarily be based on the PMI protocol (e.g., they can be based on any desired protocol used within the device 110). The device 110 then transmits the PHY message to the device 114 for use by the device 114 to configure at least one PHY operational parameter of the device 114, and the device 114 is located remotely with respect to the device 110.

Generally speaking, management and control of the RPD, described as device 114 in the examples above, is performed using one or more other devices within the system that are located remotely with respect to the device 114. Note that different respective devices make include different integrated circuits, chips, etc. for different purposes. For example, the device 110 may include a PHY management processor configured to perform remote PHY management of the RPD. In another example, the device 112 may include a MAC management processor configured to perform remote MAC management of the RPD via the device 110 that includes a PHY management processor configured to interpret and process MAC message is provided from the device 112. Any of a number of different topologies and configurations may be used to effectuate the remote control and management of the RPD including management and control by a single device located remotely from the RPD or by two or more devices located remotely from the RPD. The use of the novel PMI protocol presented herein allows for the management and control of the RPD to be performed remotely. The PMI protocol allows for the appropriate formatting of such PHY and or MAC messages to be transmitted between different devices to direct the operation of the RPD.

FIG. 1B is a diagram illustrating another embodiment 102 of one or more communication systems. A cable headend transmitter 130 provides service to a set-top box (STB) 122 via cable network segment 198. The STB 122 provides output to a display capable device 120. The cable headend transmitter 130 can support any of a number of service flows such as audio, video, local access channels, as well as any other service of cable systems. For example, the cable headend transmitter (CHT) 130 can provide media (e.g., video and/or audio) to the display capable device.

The cable headend transmitter 130 may provide operation of a cable modem termination system (CMTS) 140a. For example, the cable headend transmitter 130 may perform such CMTS functionality, or a CMTS may be implemented separately from the cable headend transmitter 130 (e.g., as shown by reference numeral 140). The CMTS 140 can provide network service (e.g., Internet, other network access, etc.) to any number of cable modems (shown as CM 1, CM 2, and up to CM n) via a cable modem (CM) network segment 199. The cable network segment 198 and the CM network segment 199 may be part of a common network or common networks. The cable modem network segment 199 couples the cable modems 1-n to the CMTS (shown as 140 or 140a). Such a cable system (e.g., cable network segment 198 and/or CM network segment 199) may generally be referred to as a cable plant and may be implemented, at least in part, as a hybrid fiber-coaxial (HFC) network (e.g., including various wired and/or optical fiber communication segments, light sources, light or photo detection components, etc.).

A CMTS 140 (or 140a) is a component that exchanges digital signals with cable modems 1-n on the cable modem network segment 199. Each of the cable modems is coupled to the cable modem network segment 199, and a number of elements may be included within the cable modem network segment 199. For example, routers, splitters, couplers, relays, and amplifiers may be contained within the cable modem network segment 199. Generally speaking, downstream information may be viewed as that which flows from the CMTS 140 to the connected cable modems (e.g., CM 1, CM2, etc.), and upstream information as that which flows from the cable modems to the CMTS 140.

In an example of operation, CM 1 generates a PHY message (e.g., based on a MAC message generated within the CM 1 or received from another device within the system) that is based on the PMI protocol. A RPD within the CMTS 140, such as CMTS PHY 140-1, receives and interprets the PHY message and uses the PHY message to configure one or more operational parameters of the RPD. In another example of operation, CM 2 generates a PHY message (e.g., based on a MAC message generated within the CM 2 or received from another device within the system) that is based on the PMI protocol. A RPD within the CMTS 140a, such as CMTS PHY 140a-1, receives and interprets the PHY message and uses the PHY message to configure one or more operational parameters of the RPD. In another example of operation, CM 3 generates a PHY message (e.g., based on a MAC message generated within the CM 3 or received from another device within the system) that is based on the PMI protocol. A RPD within the cable headend transmitter 130, such as CHT PHY 130-1, receives and interprets the PHY message and uses the PHY message to configure one or more operational parameters of the RPD. Generally speaking, the management of control of and RPD within any example of a CMTS or cable headend transmitter may be performed within another device that is located remotely with respect to that CMTS or cable headend transmitter.

With respect to the topology and arrangement of the various devices within this diagram, note that any one of the various CMs may be located within different respective chassis (e.g., such as within different locations for use by different users). The cable headend transmitter 130 may be located within a separate chassis that is located remotely with respect to the chassis of any of the various CMs. The CMTS 140 may be located within yet another separate chassis that is located remotely with respect to the chassis of any of the various CMs and the cable headend transmitter 130. In general, any of the various devices may be located within different chassis that are either located within a common location (e.g. such as within a common equipment room) or located remotely with respect to one another with an entirely different locations (e.g., a first chassis in a first building, a second chassis and a second building that is remotely located with respect to the first building).

FIG. 2A is a diagram illustrating an example 201 of a communication device (CD) operative within one or more communication systems. The device 110 includes a communication interface 220 and a processor 230. The communication interface 220 includes functionality of a transmitter 222 and a receiver 224 to support communications with one or more other devices within a communication system. The device 110 may also include memory 240 to store information including one or more signals generated by the device 110 or such information received from other devices (e.g., device 112) via one or more communication channels. Memory 240 may also include and store various operational instructions for use by the processor 230 in regards to the processing of messages and/or other received signals and generation of other messages and/or other signals including those described herein. Memory 240 may also store information including one or more types of encoding, one or more types of symbol mapping, concatenation of various modulation coding schemes, etc. as may be generated by the device 110 or such information received from other devices via one or more communication channels. The communication interface 220 supports communications to and from one or more other devices (e.g., CD 112 and/or other communication devices). Operation of the communication interface 220 may be directed by the processor 230 such that processor 230 transmits and receives signals (TX(s) and RX(s)) via the communication interface 220.

Generally speaking, the communication interface 220 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and or frequency downscaling, such as to a baseband frequency at which one or more of the components of the device 110 operates), equalization, pre-equalization, metric generation, symbol mapping and/or de-mapping, automatic gain control (AGC) operations, and/or any other operations that may be performed by an AFE and/or PHY component within a communication device.

Note that device 110 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system.

In an example of operation, the CD 110 generates a PHY message based on the PMI protocol and transmits that PHY message to the CD 112. The CD 112 then receives and interprets the PHY message to configure at least one operational parameter therein. Note also that CD 112 may be configured to generate and transmit other PHY messages to the CD 110 for use by the CD 110 to determine status, operational, or configuration related information of the CD 112. Generally, the use of a known PMI protocol allows for the physical layer (PHY) and media access control (MAC) management functions and operations associated with the RPD of the CD 112 to be handled in separate locations.

FIG. 2B is a diagram illustrating another example 202 of a CD operative within one or more communication systems. In this example 202, the CD 110 includes a PHY management processor 110a, the CD 112 includes an MAC management processor 112a, and the CD 114 includes an RPD 114a. The various CDs 110, 112, and 114 are in communication with one another via one or more network segments 116. In this particular example 202, the CD 112 performs MAC related management of the RPD 114a within the CD 114, and the CD 110 performs PHY related management of the RPD 114a within the CD 114. This example 202 shows a situation in which the MAC and PHY related management of the RPD 114a are distributed among two different devices, the CDs 110 and 112.

The CD 110 receives an MAC message from the CD 112 (e.g., generated by the MAC management processor 112a) and processes that MAC message to generate a PHY message for the CD 114 (e.g., using the PHY management processor 110a). The CD 110 then transmits the PHY message to the CD 114 for use by the CD 114 to configure at least one PHY operational parameter of the RPD 114a. Note that the difference CDs 110, 112, and 114 may be distributedly implemented throughout a communication system and located remotely with respect to each other.

In another example of operation, the CD 110 receives, from the RPD 114a of CD 114, another PHY message that indicates status information of the CD 114. This another PHY message is also based on the PMI protocol. The CD 110 then generates, based on the another PHY message, another MAC message for the CD 112, and this another MAC message is based on the PMI protocol. The CD 110 then transmits this another MAC message to CD 112 for use by the CD 112 to determine status or change of status of the at least one PHY operational parameter within the RPD 114a of CD 114.

Generally speaking, communications may be made to and from the RPD 114a of CD 114 by any one or more other CDs within the system to perform PHY management and control of the RPD 114a of CD 114.

FIG. 2C is a diagram illustrating another example 203 of a CD operative within one or more communication systems. In this example 203, the CD 110 includes a PHY management processor 110a and a MAC management processor 110b. In some examples, the CD 112 includes an MAC management processor 112a. The CD 114 includes an RPD 114a. The various CDs 110, 112, and 114 are in communication with one another via one or more network segments 116. In this example 203, The CD 110 generates a PHY message for the CD 114 (e.g., using the PHY management processor 110a). In some situations, the PHY message is generated based on a MAC message (e.g., generated by the MAC management processor 112a). The CD 110 then transmits the PHY message to the CD 114 for use by the CD 114 to configure at least one PHY operational parameter of the RPD 114a. In this example 203, note that the MAC and PHY management functions for the RPD 114a of the CD 114 are both performed remotely within the CD 110.

With respect to the various examples of communications within FIGS. 2A, 2B, and 2C above, as well as with respect to other examples provided herein, note that communications may be performed in either direction between devices. Note that the RPD 114a of the CD 114 may provide PHY messages to the CD 110 and/or the CD 112 based on the PMI protocol.

FIG. 2D is a diagram illustrating an example 204 of the relationship between a physical layer (PHY), a media access control (MAC) layer, and higher protocol layers. A communication device (e.g., CD/device 110) may be implemented to include at least one physical layer (PHY) component and at least one MAC (Medium Access Controller) component that is connected to and/or communicatively coupled to that at least one PHY component. Such a PHY component may be viewed as being a communication transceiver or communication interface (e.g., communication interface 220), situated low in a communication protocol stack and that is connected to or communicatively coupled to a communication pathway (e.g., a bus, or PHY/MAC interface (PMI)) that ties the PHY component to 1 or more higher protocol layers (such as a MAC (Medium Access Controller) and/or higher application layers in some instances). In some instance, a single circuitry (e.g., an integrated circuit) includes both at least one PHY component and at least one MAC component therein to support MAC and PHY operations. A protocol may be used for communications (e.g., various signals, messages, etc.) as described herein via a PHY/MAC interface (PMI).

Generally speaking, the different layers within a communication system, such as the PHY, the MAC, etc. and/or other higher protocol layers, may be understood with reference to the different abstraction layers into which a communication system is partitioned. There exist different models within the art to describe the various layers within a communication system, and one example of such partitioning is based on the Open Systems Interconnection (OSI) model (ISO/IEC 7498-1) conceptual model that includes seven logical layers including, the physical layer (e.g., the PHY layer), the data link layer (e.g., that includes the media access control (MAC) layer), and one or more higher layers such as the network layer, the transport layer, the session layer, the presentation layer, and the application layer. Generally, the different abstraction layers may be partitioned into the PHY layer and the MAC and reconciliation layers (e.g., that include any higher layers above the PHY layer).

FIG. 2E is a diagram illustrating an example 205 of a physical layer (PHY)/media access control (MAC) interface (PMI) as may be implemented within a communication device and/or communication system. A PHY/MAC interface (PMI) 270 allows for remote management and control of a remote PHY device (RPD) 114a. The RPD 114a may be viewed as being an orthogonal frequency division multiple access (OFDMA) receiver core in some examples. Additional details of OFDMA are provided below. PMI in refers to messages from the PMI 270 to the RPD 114a, PMI out refers to messages from the RPD 114a to the PMI 270. A slave interface includes registers and memory configured to allow for read and write access to the RPD 114a.

In addition, messages may be provided using the PMI 270 upstream (US) to higher protocol layers, such as an MAC layer. Scheduling may be provided to and from the RPD 114a via the PMI 270. Also, various communications including coordination and control may be supported via the PMI 270 for purposes such as proactive network maintenance (PNM) (e.g., channel-specific and/or spectrum-wide related information that may be used to identify existing, potential, and/or predicted problems in the communication system). In general, the PMI 270 (e.g., running between the MAC and the PHY layer and/or between the higher protocol layer(s) and the PHY layer) provides a new communication protocol by which remote management and control of the RPD 114a may be performed by one or more other devices that are remotely located with respect to the RPD 114a. Note that such a PMI 270 generally specifies a protocol running between the MAC and the PHY layers (or generally between the PHY and higher protocol layer(s)). In this diagram, the protocol between the PMI 270 and RPD 114a may be implemented as an internal protocol.

Note also that the protocol running between the MAC and the PHY in the PMI 270 can run over another protocol, such as the L2TP (Layer 2 Transparent Protocol) (e.g., an Ethernet protocol). Note that such a PMI protocol as described herein may operate on top of any other desired protocol including such a L2TP and/or Ethernet protocol. In such a case, a PMI Control Word (as described herein) is not needed due to the L2TP layer includes similar information.

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor and the communication interface of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 52 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 3A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Certain examples of communication devices and/or communication systems that operate based on SC signaling may be implemented to operate based on quadrature amplitude modulation (QAM) modulation in combination with SC signaling.

Generally, a communication device may be configured to include a processor and the communication interface configured to process received OFDM or OFDMA symbols and/or frames (and/or SC symbols and/or frames) and to generate such OFDM or OFDMA symbols and/or frames (and/or SC symbols and/or frames). The processor and the communication interface of the communication device are configured to support any MAC and/or PHY messages such as described herein based on OFDM/A signaling.

Various types of messages are described with respect to many of the following Figures, diagrams, etc. Any of these messages may be implemented based on an OFDM/A format such that a vertical axis can be sub-carriers and a horizontal axis can be time (e.g., such as with respect to FIG. 3A) or vice versa.

Some examples of messages that can be transferred via a PMI include, but are not limited to, data—header segment, data—trailer segment, request (sub-slot), ranging—header segment, ranging—trailer segment, probe—header segment, probe—payload, modulation error ratio (MER) probe—header segment, MER probe—payload, MER probe—trailer segment, capture probe—header segment, capture probe—payload, capture probe—trailer segment, map message, P-MAP message, UCD—upstream channel descriptor, burst descriptor—IUC3 (Interval Usage Code), burst descriptor—IUC4, burst descriptor—IUC5-6/9-13, configuration parameters, and statistics (registers).

Herein, SID stands for Service Identifier, IUC stands for Interval Usage Code, FEC stands for forward error correction, MER stands for modulation error ratio, IE stands for information element, UCD stands for upstream channel descriptor, EQ stands for equalizer, and TLV stands for type-length-value.

FIG. 4A is a diagram illustrating an example 401 of a message that is compliant with a PHY/MAC interface (PMI) protocol. In general, messages that are compliant with the PMI protocol include a header, a payload, and the trailer. In some of the examples described above including and MAC message and a PHY message, a MAC message may be implemented to include a first header, a first payload, and a first trailer, and a PHY message may be implemented to include a second header, a second payload, and a second trailer.

FIG. 4B is a diagram illustrating an example 402 of a message types/purposes. The various messages transmitted according to the PMI protocol may be used for different purposes. Examples of types of messages for various purposes may include messages for data, burst request, ranging, probe information, and or other purposes. Note that any of a number of different types of probes may be used including modulation error ratio (MER) probe and capture probe.

By using a known PMI protocol, different types of messages having particular formats may be transmitted so that information, coordination, and control of a RPD may be performed by one or more other devices located remotely with respect to the RPD. Note that the RPD may be controlled and configured based on messages that are compliant with the PMI protocol, and also note that the RPD may provide information to other devices including those that control the RPD using messages that are compliant with the PMI protocol.

FIG. 4C is a diagram illustrating an example 403 of a PMI control word. Various messages may be generated based on this PMI control word format such that a first field indicates the packet type of the message, bits that include the first and last segments in the packet, air indication, a segment count that indicates the segment cyclic counter per packet type, and the segment size in bytes. Note that this example 403 includes a specific 64-bit example of a PMI control word, but note that other examples may include more or fewer bits and/or include additional fields.

FIG. 4D is a diagram illustrating an example 404 of a PMI packet. A PMI packet is fragmented into multiple segments. In this example, each segment has 64 bits of control word as described with reference to FIG. 4C, and the maximum PMI segment size is 512 bytes. Generally speaking, different PMI segments (0, 1, . . . , n) are separated by respective control words within the PMI packet.

FIG. 5A is a diagram illustrating an example 501 of a PMI out packet type. Depending on the number provided within the type field within a PMI control word, the type of information included therein may be indicated to be data payload, data trailer, request, ranging, probe, modulation error ratio (MER) probe, capture probe, digital signal processor (DSP) control, CPU (processor) control, various diagnostic information (e.g., for different test ports within the RPD, such as 0, 1, or 2), or trap.

FIG. 5B is a diagram illustrating an example 502 of a PMI in packet type. Similarly, depending on the number provided within the type field within a PMI control word, the type of information included therein may be indicated to be a MAP message based on one or more versions of the Data Over Cable Service Interface Specification (DOCSIS) (e.g., MAP is a capitalized acronym such as used in DOCSIS, and is based on a broadcast message sent to other communication devices that includes a schedule, Service ID (SID), etc. so that the respective other communication devices perform transmissions upstream (US) in a coordinated using particular time slot(s) as indicated in the MAP message), probe-MAP (P-MAP), upstream (US) channel descriptor (UCD), DSP control, and CPU control. With respect to the MAP messages, in one example, a RPD uses such map messages to determine when to expect communications (e.g., US bursts) and particularly which parameters should be used to receive those communications (e.g., with knowledge of which parameters have been used by another communication device to transmit those communications).

Note that the DIAG and Control packets send from the OFDMA are encapsulated by the PMI and send out over the Ethernet. For each following groups, dedicated Pseudowire can be used: (2) DIAG-0, DIAG-1 and DIAG-2, (2) DSP Control, and (3) CPU Control.

FIG. 5C is a diagram illustrating an example 503 of a trap used to indicate an error detected by the PHY. The traps are used to indicate the upper layer the error detected by the PHY. A dedicated Pseudowire may be used for the traps. Trap encode as type-length-value (TLV). The First TLV is the Trap ID, the Length includes the all trap subsequent TLVs, and one or multiple traps are sent in one message. Traps may be used to indicate MAP Error (Start Time, minislot number) and configuration error (e.g., register address).

FIG. 5D is a diagram illustrating an example 504 of a header and payload of a message that is compliant with a PMI protocol. This format may be used for grants with interval usage codes (IUCs) 5, 6, 9-13. Separate PMI packets may be used for Data Payload and Data Trailer. In one example, one data grant in the PMI packet (e.g., with no concatenation).

| Field | Size (bits) | Function |
|---|---|---|
| Reserved | 12 | |
| IUC | 4 | This is the IUC that the message was received |
| Reserved | 2 | |
| SID | 14 | The SID used in the MAP to grant bandwidth for the transmit opportunity associated with this PMI header segment |
| Start Minislot | 32 | This is the minislot number that corresponds to the first minislot of the transmit opportunity |

FIG. 5E is a diagram illustrating an example 505 of a trailer of a message that is compliant with a PMI protocol. One Data Trailer is included in one PMI packet. This can include vendor/manufacturer specific parameters (e.g., noise and MER) are present when the 'Data Trailer VSP' is enabled. The size of trailer when the VSP is attached is 58 bytes in one example. Frequency and Timing Errors may be provided in some examples but not in others.

| Field | Size (bits) | Function |
|---|---|---|
| Reserved | 12 | |
| IUC | 4 | This is the IUC that the message was received |
| Reserved | 2 | |
| SID | 14 | The SID used in the MAP to grant bandwidth for the transmit opportunity associated with this PMI header segment |
| Start Minislot | 32 | This is the minislot number that corresponds to the first minislot of the transmit opportunity |
| Burst Status | 8 | Bit 7—Power Level high<br>0 = The 'Power Error' below the 'Power Data High Threshold'<br>1 = The 'Power Error' equal or above the 'Power data High Threshold'<br>Bit 6—Power Level low<br>0 = The 'Power Error' above the 'Power Data Low Threshold'<br>1 = The 'Power Error' equal or below the 'Power Data Low Threshold'<br>Bit 5: Probe Required<br>0 = The 'RxMER' above the 'Data RxMER Threshold'<br>1 = The 'RxMER' equal or below the 'Data RxMER Threshold'<br>Bit 4: Internal PHY Error field is valid<br>0 = Internal PHY Error field is not valid, 1 = Internal PHY Error field is valid<br>Bit 3: Internal PHY Error<br>0 = Internal PHY Error detected, 1 = Internal PHY Error not detected<br>Bit 2: Timing Error field is valid<br>0 = Timing Error field is not valid, 1 = Timing Error field is valid<br>Bit 1: Power Error field is valid<br>0 = Power Error field is not valid, 1 = Power Error field is valid<br>Bit 0: Frequency Error field is valid<br>0 = Frequency Error field is not valid, 1 = Frequency Error field is valid |
| FEC-Long | 8 | The number of long codewords received in this burst |
| FEC-Med | 4 | The number of medium codewords received in this burst |
| FEC Iterations-Long | 4 | The number of short codewords received in this burst |
| FEC Iterations-Med (Medium) | 8 | The average number of decoding iterations of all long codewords in this burst |
| FEC Iterations-Short | 8 | The average number of decoding iterations of all short codewords in this burst |
| FEC Post-Syndrome Pass-Long | 8 | The number of long codewords that failed pre-decoding syndrome check, but passed post-decoding syndrome check in this burst |
| FEC Post-Syndrome Fail-Long | 8 | The number of long codewords that failed post-decoding syndrome check in this burst |
| FEC Post-Syndrome Pass-Med | 4 | The number of medium codewords that failed pre-decoding syndrome check, but passed post-decoding syndrome check in this burst |
| FEC Post-Syndrome Fail-Long | 4 | The number of medium codewords that failed post-decoding syndrome check in this burst |
| FEC Post-Syndrome Pass-Short | 4 | The number of short codewords that failed pre-decoding syndrome check, but passed post-decoding syndrome check in this burst |

| Field | Size (bits) | Function |
| --- | --- | --- |
| FEC Post-Syndrome Fail-Long | 4 | The number of short codewords that failed post-decoding syndrome check in this burst |
| Reserved | 16 | |
| RxMER | 8 | Measured average modulation error ratio over all sub-carriers. If 'Data RxMER Normalized' = 0 the value is unsigned 8-bit, 0.25 dB units. If 'Data RxMER Normalized' = 1 the RxMER is normalized according to the modulation of the grant's minislots. The value is signed 8-bit, 0.25 dB units. |
| Power Error | 8 | Measured receive burst power error. The error calculates as the received power compared to the 'Input Power Level Target' = signed 8 bits in 0.25 dB unit. |
| Reserved | 48 | |

FIG. 6A is a diagram illustrating an example 601 of a request subslots message. In one example, multiple sub-slots from the same MAP grant are concatenated to one PMI packet, and the number of subslot payloads included in the packet is determined by the size field in the control word. A maximum of 63 subslots payloads may be used in a packet in one example (e.g., for segment of 512 bytes). Sub-slots of one MAP grant may split to multiple PMI packets, and the split may be in a boundary of minislot. For every subslot allocated by the MAP, the RPD (e.g., RPD receiver) sends the payload. The PMI check the header check sequence (HCS) of the Request message only when the 'Receive Status'=No Collision. A header is followed by a number of payloads.

FIG. 6B is a diagram illustrating an example 602 of a ranging message. Such ranging can be used to provide receiver support for the RPD (e.g., OFDMA receiver). Ranging is reported for each ranging grant including the grants that the preamble is not detected. When the ranging preamble is not detected, then the payload is not sent (e.g., bit 4 in the status field 'Payload not present' set to one), and the power and timing fields are not valid. In one example, the ranging payload size is as follows: Initial ranging: 10 bytes+2 bytes reserved, and Fine Ranging: 34 bytes+2 bytes reserved. RxMER (receiver modulation error ratio (Rx-MER) data, which can be measured during a probe) and Frequency Error are not provided in this example.

FIG. 6C is a diagram illustrating an example 603 of a pre-equalizer probe message. In one example, a minimum probe size for equalizer coefficients=2 symbols. A stagger probe may be used for mobile station modem (MSM) modems as long as the probe contains 2 symbols on every sub-carrier. In one example, a maximum probe size in symbols equal to the maximum K allowed, regardless to the current K (e.g., 36 symbols in encompassed of 24 MHz). In a stagger probe, the size refers to the overall staggered symbols.

The equalizer coefficients are divided into sets when there are exclusion sub-carriers within the encompassed spectrum as follows: (1) for narrow exclusions, report zeros for these coefficients, and (2) for wider exclusions terminate current equalizer coefficient set and start a new set. This also operates to report equalizer coefficients on all non-excluded sub-carriers to avoid phase discontinuity. An 'Equalizer Report Threshold' may be used to reduce the equalizer coefficients reports. If any coefficients are equal to or above the 'Equalizer Report Threshold', then all coefficients will be provided. If all coefficients are below the 'Equalizer Report Threshold', then the equalizer coefficients are not sent.

Timing Error is a measure over up to 512 sub-carriers. The measure sub-carriers range is configurable (main probe section). For probes of fewer than 8 symbols, the OFDMA reports a single timing offset. The RxMER is not reported.

For probes of 8 symbols or more, timing can be provided for multiple sections in addition to the main section. RxMER can be provided for the same timing sections. For example, it can be provided for 8 symbol probe up to 8 sections. For more than 8 symbol probe, one additional section per one additional probe symbol over the 8 symbols can be provided (e.g., with a maximum sections=32).

For skip/stagger probes, this can operate to provide sections when the probe contains at least 8 symbols on every sub-carrier. Frequency Error can be provided for probes with 8 symbols and more.

The Timing and RxMER section may contain up to 512 sub-carriers. Sections may not be overlapped, gaps between sections may be allowed, the section size may be at least 32 sub-carriers, and exclusion sub-carriers within a section may not allowed unless the size of each continues active sub-carriers group are in size of at least 32 sub-carriers. Note that if the probe is deleteriously affected by burst noise, the burst noise information is provided in the vendor specific parameter (VSP) portion.

FIG. 6D is a diagram illustrating an example 604 of a modulation error ratio (MER) probe message. A RxMER probe is perform when the MER bit in the P-MAP is set to one. In one example, the minimum probe size for RxMER=6 symbols. The RxMER per sub-carrier are divided to sections when there are exclusion sub-carriers within the encompassed spectrum as follow: (1) for narrow exclusions, report zeros for these RxMER sub-carriers, and (2) for wider exclusions, terminate RxMER section and start a new section.

FIG. 7A is a diagram illustrating an example 701 of a capture probe message. The capture probe is triggered by the setting the 'Capture Probe SID' parameter, the 'Trigger Type' active or quiet, the 'Trigger Mode' one shot or repetitive and receiving the PMAP-IE with the matched SID. The selected 'Capture Probe SID' could be idle SID so the probe will capture quite time. The maximum number of symbols to be capture may be specified.

FIG. 7B is a diagram illustrating an example 702 of a MAP message. As an example, DOCSIS 3.1 Version 5 MAP converts to the following format by the PMI. An End of List (Null information element (IE)), Acknowledge and Data Grants Pending IEs may not be sent to the RPD. In one implementation, the RPD receiver core can hold 2000 Grant Information Elements. Invalid MAPs (e.g., as determined per CRC fail, number elements not match the MAP length, etc.) are not forwarded to the RPD. The RPD checks the MAP for such early, late, overlap and un-mapped minislots.

FIG. 7C is a diagram illustrating an example 703 of a P-MAP message. A DOCSIS 3.1 Version 5 P-MAP converts to the following format by the PMI. End of List (Null IE), Acknowledge and Data Grants Pending IEs are not sent to the RPD. Invalid MAPs (e.g., as determined by CRC fail, number elements not match the MAP length, etc.) are not forward to the RPD. The RPD checks the early, late and overlap of the P-MAP IEs. Non-mapped symbols within the Probe Frame may be allowed.

Consecutive P-MAP IEs for the same SID report one Probe. The maximum probe size may be as defined above. For consecutive elements over the maximum, the probe report is split.

Consecutive P-PMAP IEs may be defined as follows: (1) for non-staggered probe, consecutive IEs having the same value except the 'Symbol In Frame' field are incremented by one, and the 'Probe Frame' incremented by one when the 'Symbol In Frame' is equal to zero, and (2) for staggered probe, consecutive IEs (case 2 in the example) OR group of consecutive IEs (case 3 in the example) with maximum distance (location in the P-MAP) between them are smaller or equal to the 'Subc Skip'+1 AND such that these IEs have the same value except the 'Symbol In Frame' field is incremented by 'Subc Skip'+1 and the 'Probe Frame' is increment by one when the 'Symbol In Frame'+'Subc Skip' is equal or higher than the symbols in frame.

FIG. 7D is a diagram illustrating an example 704 of an upstream (US) channel descriptor (UCD) format message. The UCD message is sent by the PMI to the RPD at the first time after power up and when the CCC is incremented. Other UCDs are dropped by the PMI. The MMM Header is dropped by the PMI and 32 bits of header is added.

In one example, the maximum size of the UCD message=2458+8 bytes, Channel Descriptor=629, Buffer Descriptors IUC 3,4=15×2, Buffer Descriptors IUC 5,6,9-13=257×7. Note that some implementation of a PMI protocol that operate as described herein do not require or include UCD therein. In some examples, a message having a format of such a UCD can be sent to the RPD for use in determining information of the RPD.

FIG. 8A is a diagram illustrating an example 801 of a CD 110 operative within one or more communication systems. The device 110 includes a physical layer (PHY) processor (e.g., a communication interface) 820 and a media access control (MAC) processor 830. The PHY processor 820 includes functionality of a transmitter 822 and the receiver 824 to support communications with one or more other devices within a communication system. The device 110 may also include memory 840 to store information including communication profiles to be employed by the device 110 or such information received from other devices via one or more communication channels. Memory 840 may also include and store various operational instructions for use by the processor 830 in regards to profile selection, operational mode selection, etc. as described herein. Memory 840 may also include and store information related to instructions and operations such as may be used in performing various operations (e.g., profile and/or operational mode selection such as may be performed when operating in one or more various communication protocols, communication standards, and/or recommended practices).

The PHY processor 820 is configured to support communications to and from one or more other devices. The relative operations of the PHY processor 820 in the MAC processor 830, and or other higher layers 850, may be understood with reference to the different abstraction layers into which a communication system may be partitioned. One example of such partitioning is based on the Open Systems Interconnection (OSI) model (ISO/IEC 7498-1) conceptual model that includes seven logical layers including, the physical layer (e.g., the PHY layer), the data link layer (e.g., that includes the media access control (MAC) layer), and one or more higher layers such as the network layer, the transport layer, the session layer, the presentation layer, and the application layer. Generally, the different abstraction layers may be partitioned into the PHY layer and the MAC and reconciliation layers (e.g., that include any higher layers above the PHY layer).

The PHY processor 820 of device 110 is configured to receive one or more communications from the MAC processor 830 (e.g., such as those generated by the MAC processor 830 or provided from one or more of the higher layers 850). The PHY processor 820 may be configured to select a profile based on one or more characteristics of a communication pathway between device 110 and device 112. The PHY processor 820 may select a first profile for transmission of a first packet to device 112 and a second profile for transmission of a second packet to device 112. In addition, the PHY processor 820 may operate using different operational modes at different times. The PHY processor 820 may operate using a first mode at one time and a second mode and another time. The communications made between the PHY processor 820 and the MAC processor 830 may be based on a protocol used for communications (e.g., various signals, messages, etc.) as described herein via a PHY/MAC interface (PMI).

FIG. 8B is a diagram illustrating another example 802 of a CD 110 operative within one or more communication systems. This example 802 shows further details of the PHY processor 820. The PHY processor 820 may be subdivided into an analog front end (AFE) 880, a converter section 870, and a digital front end (DFE) 860. The PHY processor 820 may be further described to include transmit and receive paths within each of the AFE 880, converter section 870, and the DFE 860. For example, a transmit path may be viewed as including a transmitter portion 861 of the DFE 860, a digital to analog converter (DAC) 871 of the converter section 870, and a transmitter portion 881 of the AFE 880. A receive path many viewed as including receiver portion 882 of the AFE 880, an analog to digital converter (ADC) 872 of the converter section 870, and a receiver portion 862 of the DFE 860. Generally speaking, the AFE 880 may be viewed as performing operations such as signal scaling and filtering, frequency conversion from a transmission frequency or radio frequency (RF) to a frequency of the converter section 870 (e.g., such as baseband frequency or an intermediate frequency), and other analog-based operations. The converter section 870 may be viewed as performing conversion between the digital and analog domains. The DFE 860 may be viewed as performing operations typically associated with a baseband processor such as filtering, scaling, frequency conversion, data buffering, etc. In one implementation, the DFE 860 performs profile and/or operational mode selection by which packets received from the MAC processor 830 are transmitted to device 112.

Note that in either example 801 or 802 of device 110, a singular processor may be configured to perform operations of both the MAC processor 830 and the PHY processor 820. However, note that device 110 may be configured to perform such profile and/or mode selection at the PHY layer even in such instances in which a singular processor performs operations of both the MAC processor 830 and the PHY processor 820.

In this example 802 as well, note that the communications made between the PHY processor 820 and the MAC processor 830 may be based on a protocol used for communications (e.g., various signals, messages, etc.) as described herein via a PHY/MAC interface (PMI).

FIG. 9A is a diagram illustrating an embodiment of a method 901 for execution by one or more communication devices. The method 901 operates by receiving (e.g., via a communication interface of a communication device and from a first other communication device), a media access control (MAC) message for a second other communication device (block 910). The MAC message is based on a physical layer (PHY)/MAC interface (PMI) protocol. The method 901 continues by generating, based on the MAC message, a physical layer (PHY) message for the second other communication device (920). The PHY message is also based on the PMI protocol. The method 901 then operates by transmitting, via the communication interface of the communication device, the PHY message to the second other communication device for use by the second other communication device to configure at least one PHY operational parameter within the second other communication device (block 930). The second other communication device is located remotely with respect to the communication device that performs the method 901.

FIG. 9B is a diagram illustrating another embodiment of a method 902 for execution by one or more communication devices. The method 902 operates by generating a MAC message for another communication device (block 911). The method 902 continues by generating, based on the MAC message, a physical layer (PHY) message for the another communication device (block 921). The PHY message is based on the PMI protocol. The method 902 then operates by transmitting, via a communication interface of the communication device, the PHY message to the another communication device for use by the another communication device to configure at least one PHY operational parameter within the another communication device (block 930). The another communication device is located remotely with respect to the communication device that performs the method 902.

FIG. 9C is a diagram illustrating another embodiment of a method 903 for execution by one or more communication devices. The method 903 operates by receiving (e.g., via a communication interface of a communication device and from a first other communication device), a PHY message (block 912). The first other communication device includes a remote PHY device (RPD) in this method 903. The PHY message is based on a PMI protocol. The method 903 continues by generating, based on the PHY message, a MAC message for a second other communication device (922). The MAC message is also based on the PMI protocol. The method 903 then operates by transmitting, via the communication interface of the communication device, the MAC message to the second other communication device for use by the second other communication device to determine status or change thereof of the RPD (block 932). The second other communication device is located remotely with respect to the communication device that performs the method 903.

FIG. 9D is a diagram illustrating another embodiment of a method 904 for execution by one or more communication devices. The method 904 operates by receiving (e.g., via a communication interface of a communication device and from a first other communication device), a PHY message (block 913). The first other communication device includes a remote PHY device (RPD) in this method 904. The PHY message is based on a PMI protocol. The method 904 continues by generating, based on the PHY message, a MAC message for a second other communication device (923). The method 904 then operates by processing the MAC message to determine status or change thereof of the RPD (block 932). The second other communication device is located remotely with respect to the communication device that performs the method 904. In some alternative embodiments, the method 904 operates by processing the PHY message to determine status or change thereof of the RPD (block 943).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
a communication interface; and
a processor, the processor and the communication interface configured to:
receive, from a first other communication device, a media access control (MAC) message for a second other communication device, wherein the MAC message is based on a physical layer (PHY)/MAC interface (PMI) protocol;
generate, based on the MAC message, a physical layer (PHY) message for the second other communication device, wherein the PHY message is based on the PMI protocol; and
transmit the PHY message to the second other communication device for use by the second other communication device to configure at least one PHY operational parameter within the second other communication device, wherein the second other communication device is located remotely with respect to the communication device.

2. The communication device of claim 1, wherein the communication device, the first other communication device, and the second other communication device are distributedly implemented throughout a communication system and located remotely with respect to each other.

3. The communication device of claim 1, wherein the processor and the communication interface are further configured to:
receive, from the second other communication device, another PHY message that indicates status information of the second other communication device, wherein the another PHY message is based on the PMI protocol;
generate, based on the another PHY message, another MAC message for the first other communication device, wherein the another MAC message is based on the PMI protocol; and
transmit the another MAC message to the first other communication device for use by the first other communication device to determine status or change of status of the at least one PHY operational parameter within the second other communication device.

4. The communication device of claim 1, wherein:
the MAC message includes a first header, a first payload, and a first trailer;
the PHY message includes a second header, a second payload, and a second trailer; and
the MAC message and the PHY message are associated with data, burst request, ranging, or probe information for use by the second other communication device.

5. The communication device of claim 1, wherein the processor and the communication interface are further configured to:
support communications with the second other communication device using the PMI protocol, wherein the PMI protocol runs over a L2TP (Layer 2 Transparent Protocol).

6. The communication device of claim 1 further comprising:
the processor including a PHY management processor configured to perform remote PHY management of a remote PHY device within the second other communication device; and
the first other communication device including a MAC management processor configured to perform remote MAC management of the second other communication device.

7. The communication device of claim 1, wherein:
the communication device is included within a first chassis;
the second other communication device is included within a second chassis that is located remotely with respect to the first chassis; and
the second other communication device includes a cable headend transmitter or a cable modem termination system (CMTS).

8. The communication device of claim 1, wherein the processor and the communication interface are further configured to:
support communications within at least one of a satellite communication system, a wireless communication system, a wired communication system, a fiber-optic communication system, or a mobile communication system.

9. A communication device comprising:
a communication interface; and
a processor, the processor and the communication interface configured to:
generate a media access control (MAC) message for another communication device;
generate, based on the MAC message, a physical layer (PHY) message for another communication device, wherein the PHY message is based on a physical layer (PHY)/MAC interface (PMI) protocol; and
transmit the PHY message to the another communication device for use by the another communication device to configure at least one PHY operational parameter of the another communication device, wherein the another communication device is located remotely with respect to the communication device.

10. The communication device of claim 9, wherein the processor and the communication interface are further configured to:
receive, from the another communication device, another PHY message that indicates status information of the another communication device, wherein the another PHY message is based on the PMI protocol;
generate, based on the another PHY message, another MAC message; and
process the MAC message to determine status or change of status of the at least one PHY operational parameter of the another communication device.

11. The communication device of claim 9 further comprising:
the processor including a PHY management processor configured to perform remote PHY management of a remote PHY device within the another communication device; and
the processor including a MAC management processor configured to perform remote MAC management of the another communication device.

12. The communication device of claim 9, wherein:
the communication device is included within a first chassis;
the another communication device is included within a second chassis that is located remotely with respect to the first chassis; and
the another communication device includes a cable headend transmitter or a cable modem termination system (CMTS).

13. The communication device of claim 9, wherein the processor and the communication interface are further configured to:
support communications within at least one of a satellite communication system, a wireless communication system, a wired communication system, a fiber-optic communication system, or a mobile communication system.

14. A method for execution by a communication device, the method comprising:
receiving, via a communication interface of the communication device and from a first other communication device, a media access control (MAC) message for a second other communication device, wherein the MAC message is based on a physical layer (PHY)/MAC interface (PMI) protocol;
generating, based on the MAC message, a physical layer (PHY) message for the second other communication device, wherein the PHY message is based on the PMI protocol; and
transmitting, via the communication interface of the communication device, the PHY message to the second other communication device for use by the second other communication device to configure at least one PHY operational parameter within the second other communication device, wherein the second other communication device is located remotely with respect to the communication device.

15. The method of claim 14 further comprising:
receiving, via the communication interface of the communication device and from the second other communication device, another PHY message that indicates status information of the second other communication device, wherein the another PHY message is based on the PMI protocol;
generating, based on the another PHY message, another MAC message for the first other communication device, wherein the another MAC message is based on the PMI protocol; and
transmitting, via the communication interface of the communication device, the another MAC message to the first other communication device for use by the first other communication device to determine status or change of status of the at least one PHY operational parameter within the second other communication device.

16. The method of claim 14, wherein:

the MAC message includes a first header, a first payload, and a first trailer;

the PHY message includes a second header, a second payload, and a second trailer; and the MAC message and the PHY message are associated with data, burst request, ranging, or probe information for use by the second other communication device.

17. The method of claim 14 further comprising:

operating the communication interface of the communication device to support communications with the second other communication device using the PMI protocol, wherein the PMI protocol runs over a L2TP (Layer 2 Transparent Protocol).

18. The method of claim 14 further comprising:

operating a PHY management processor of the communication device to perform remote PHY management of a remote PHY device within the second other communication device; and operating a MAC management processor of the first other communication device to perform remote MAC management of the second other communication device.

19. The method of claim 14, wherein:

the communication device is included within a first chassis;

the second other communication device is included within a second chassis that is located remotely with respect to the first chassis; and the second other communication device includes a cable headend transmitter or a cable modem termination system (CMTS).

20. The method of claim 14 further comprising:

operating the communication interface of the communication device to support communications within at least one of a satellite communication system, a wireless communication system, a wired communication system, a fiber-optic communication system, or a mobile communication system.

* * * * *